United States Patent [19]
Fleck et al.

[11] Patent Number: 5,793,360
[45] Date of Patent: Aug. 11, 1998

[54] DIGITIZER ERASER SYSTEM AND METHOD

[75] Inventors: David C. Fleck, Vancouver; Richard M. Stumpf, Ridgefield, both of Wash.; Tom Picard, Portland, Oreg.

[73] Assignee: Wacom Co., Ltd., Japan

[21] Appl. No.: 437,082

[22] Filed: May 5, 1995

[51] Int. Cl.⁶ ............................................. G09G 3/02
[52] U.S. Cl. .......................... 345/179; 345/157; 345/145; 178/19
[58] Field of Search ........................ 345/163, 168, 345/156, 157, 179, 145; 395/159; 178/18, 19

[56] References Cited

U.S. PATENT DOCUMENTS

| | | |
|---|---|---|
| 4,609,776 | 9/1986 | Murakami et al. ............... 178/18 |
| 4,631,356 | 12/1986 | Taguchi et al. .................. 178/19 |
| 4,634,973 | 1/1987 | Murakami et al. ............... 324/207 |
| 4,658,373 | 4/1987 | Murakami et al. ............... 364/559 |
| 4,697,050 | 9/1987 | Farel et al. ...................... 178/18 |
| 4,878,553 | 11/1989 | Yamanami et al. .............. 178/18 |
| 5,109,225 | 4/1992 | Morita ............................. 341/5 |
| 5,272,470 | 12/1993 | Zetts ............................... 345/173 |
| 5,325,110 | 6/1994 | Tang et al. ...................... 345/157 |
| 5,401,916 | 3/1995 | Crooks ............................ 178/18 |
| 5,475,401 | 12/1995 | Verrier et al. ................... 345/179 |
| 5,515,495 | 5/1996 | Ikemoto .......................... 395/159 |
| 5,534,893 | 7/1996 | Hansen, Jr. et al. ............. 345/156 |

*Primary Examiner*—Amare Mengistu
*Attorney, Agent, or Firm*—Myers Liniak & Berenato

[57] ABSTRACT

A digitizer eraser system and method are provided so as to include a writing/erasing digitizer pen, a tablet, and a tablet driver for use in conjunction with a computer and corresponding display screen. The user selects and deletes text or cells with one stylus stroke. In one motion, the user presses select, moves the erasing stylus across the material to be selected, then at the end of the selection lifts the stylus off the tablet to delete or erase the selected material. The system permits erasing of text or objects from the display screen via a keystroke function only when predetermined cursor shapes are being used on the screen. The keystroke function is chosen from a group of possible erasing keystrokes, with the selected keystroke being based upon the cursor shape being used so that undesirable erasing keystrokes are not used in certain situations. Additionally, the cursor shapes displayed on the screen are changed in accordance with whether the stylus is in a writing or an erasing mode or position. In certain PC-based embodiments where the operating system is window-based, subclassing is used so that selection and erasure by the stylus is only permitted in subclassed windows, not all windows being subclassed.

26 Claims, 10 Drawing Sheets

DIGITIZER ERASER SYSTEM AND METHOD

This invention relates to a computer coordinate input system including erasure capability. More particularly, this invention relates to a coordinate input system including a digitizer tablet, an erasing stylus, and a tablet driver for use in conjunction with a computer and corresponding display screen, the system for providing user feedback with respect to eraser functionality and the ability to erase text and other objects from the display screen.

CLAIM TO COPYRIGHT IN REFERENCE TO MICROFICHE APPENDIX

A portion of the disclosure of this patent application contains material which is subject to copyright protection. The copyright owner has no objection to the reproduction by any one of the patent document as it appears in the Patent and Trademark Office files or records, but otherwise reserves all copyrights whatsoever.

Assembler code software (Macintosh computer with 680XX processor) for carrying out some of the method and systems described herein has been filed with the United States Patent and Trademark Office herewith in the form of a microfiche appendix including numerous frames, one of which being a title frame. The microfiche appendix includes 25 microfiche and 2,093 frames.

BACKGROUND OF THE INVENTION

Computer coordinate input devices, commonly called digitizers, are known in the art and designed to determine the coordinates of a point specified by an operator by way of a pointing device, such as a stylus. The user manipulates the stylus over the digitizer tablet within its sensing proximity, with the tablet picking up stylus frequency signals so as to locate the stylus position and switch state. Generally, the information received by the digitizer tablet is processed in accordance with a program, namely, tablet driver software commonly termed the tablet driver which is typically provided by the tablet and stylus manufacturer and installed in the computer. The processed information is then transferred to the operating system (OS) or application program of the computer for subsequent viewing on the display screen.

Such known digitizer coordinate input systems are disclosed for example in commonly owned U.S. Pat. Nos. 4,878,553 and 4,848,496.

Additionally, currently pending commonly owned U.S. patent application Ser. Nos. 08/352,133 and 08/388,265 disclose digitizer coordinate input devices as set forth above in which the tablet driver, operating system, and application program work in conjunction with one another to process received stylus coordinate indicative data.

Coordinate input systems which have erasing capability are also well-known in the art. See, for example, U.S. Pat. Nos. 4,697,050; 5,272,470; 5,325,110; and 5,401,916.

U.S. Pat. No. 4,697,050 discloses a stylus for digitizing graphical data by way of a corresponding digitizing table. The stylus or pen is double ended, with one end functioning as a writing tip and the other end as an erasing tip. By outputting an erasing frequency, the digitizer pen of the '050 patent causes information to be erased. A switch for controlling the generation of a magnetic field indicative of frequency is actuated by way of, for example, a switch sensitive to pressure exerted by the stylus on a drawing table. Additionally, there appears to be no way for the system of the '050 patent to determine whether the erase end or the write end of the pen is adjacent the table upon pen entry into the sensing proximity of the table.

U.S. Pat. No. 5,325,110 discloses an eraser stylus for use on a graphical display screen. The stylus may be replaced with a mouse. The width of the erasing swath of the eraser icon in the graphics image environment is determined by the stylus position on the eraser icon, which is on the screen. For example, in one embodiment of the '110 patent, a plurality of distinct areas are provided on the display screen (e.g. CRT). When the stylus tip is placed in a first area, the stylus may be moved (while dragging along with it the second or eraser area) anywhere across the screen without altering or erasing the present graphical images. However, when the stylus is placed in the second or erasing area of the screen, erasure is performed of the graphical images on the screen located in the path taken by the stylus tip. The erasing width can be altered by placing the stylus in different areas of the second or erasing area of the screen. Additionally, a drop shadow image may be provided in the '110 patent so as to indicate to the user which mode (e.g. erase or non-erase) the system is in.

Unfortunately, the erasing aspects of the above-referenced prior art patents suffer from a number of problems. In order to analyze these problems, it is first necessary to briefly mention cursor and cursor shape functionality in commonly known applications. For example, in known application programs, "I-beam" cursor shapes are provided on the display screen in order to signal to the user that text is being edited or entered. On the other hand, "large +" cursor shapes are used in some application programs as a cursor shape to enter and edit particular cells where data is represented in arrays, such as in a spreadsheet. "Thin +" cursor shapes are often used in graphical or drawing applications. Additionally, "arrow shape" cursor shapes are often used on the display screen in many application programs for general navigation applications, such as pulling down menus and scrolling documents. Cursor shapes on the screen are changed in current systems by the application program first retrieving the cursor shape data, often by requesting a standard shape from the operating system by a call to "Get Cursor" or "Retrieve Cursor". The cursor shape is then set on the screen by passing the retrieved cursor shape data from the application program back to the operating system by a call to "Set Cursor".

The ability to erase text or graphical information being portrayed on the screen is not desireable in all circumstances. For example, while it may be useful to be able to erase text and other objects (e.g. drawings) on the display screen in certain environments, it may not be desireable to erase certain material in different environments. For example, it is sometimes undesirable to erase a character preceding an insertion point or a drawing object currently selected when the user is navigating on a different area of the screen. The above-referenced prior art patents which utilize erasing functionality do not take into consideration these problems. In other words, prior art eraser systems do not take into account the fact that it is often not desireable to erase particular data from the display screen. In view of this, it is apparent from the above that there exists a need in the art for a digitizer erasing system and method which, while being able to erase particular objects and text from the screen, is prohibited from erasing other specified data.

The above-identified prior art patents also suffer with respect to user feedback. It is desireable to let the user know, simply by viewing the cursor shape (where the user's focus typically is) being displayed on the screen, whether or not the system is in an erase mode or, for example, a write mode. While the '110 patent discussed above utilizes a shadow image to inform the user which mode the system is in, the drop shadow of the '110 patent does not adjust to different cursor shapes. The shadow image of the '110 patent is only associated with the erase area or tool on the screen, not with other usable cursor shapes and areas which may be utilized by the user in editing, navigating, etc. Thus, the user feedback is only given at the tool location; and not at the cursor itself. Because the user's attention is typically focused on the cursor, this is a problem associated with the '110 patent.

In view of the above, it is apparent that there exists a need in the art for a digitizer erasing system including a user feedback method and system applicable to and focused at a plurality of cursor shapes to be used on the screen, where the user is informed, simply by viewing the cursor shape being viewed, whether the cursor or system is in an "erase" mode or otherwise.

Furthermore, the above-described prior art erasing systems suffer from the apparent fact that the same method of erasing is employed no matter what the user is doing. In other words, erasing of information is carried out in the same manner whether the user is pulling down menus, scrolling a document, entering and editing cells, editing spreadsheets, entering and editing text, etc. This represents a problem in view of the fact that certain methods of erasure affect different areas of the system in different ways. For example, let us assume that erasing is being carried out in all cases by simulation of a "command X" keystroke. The use of this keystroke has different effects in some systems dependent upon whether it is carried out in a spreadsheet, a menu, or a text environment. For example, this keystroke will wipe out clipboard information in certain MS-WINDOWS™ applications, even if the clipboard is not being displayed. In view of this, it is not desirable to use the "command X" keystroke to erase in all circumstances although it will work fine in many situations. The above-referenced erasing systems do not take this into consideration.

It is apparent from the above that there exists a need in the art to customize the method of erasing (e.g. the keystroke or keystrokes utilized to carry out erasing) in response to the environment (e.g. cursor shape being used or window being used in PC-based applications) in which the user is erasing. Thus, the erasing of text in a document may be carried out by one keystroke function, and the erasing of spreadsheet data may be carried out by another so as to improve over the prior art.

It is a purpose of this invention to fulfill the above-described needs, as well as other needs in the art which will become more apparent to the skilled artisan once given the following disclosure.

SUMMARY OF THE INVENTION

Generally speaking, this invention fulfills the above-described needs in the art by providing a digitizer system adapted to be used with a computer having a display screen, the system comprising:

a stylus having a circuit for generating an eraser indicating signal;

a tablet for detecting the eraser indicating signal and location of the stylus so that a cursor shape on the display screen is moved in conjunction with the stylus;

a tablet driver for receiving stylus data from the tablet, the tablet driver adapted to be in communication with the computer; and wherein the tablet driver permits the stylus to erase text or objects from the display screen only when one of a predetermined number of acceptable erasing cursor shapes is being displayed on the display screen.

In certain preferred embodiments, the system further comprises setting means in the tablet driver for setting a variable to a valid number when the cursor shape being used on the screen is one of the predetermined number of acceptable erasing cursor shapes, the setting means also for setting the variable to an invalid number when the cursor shape being used on the screen is not one of the predetermined number of acceptable erasing cursor shapes, and wherein the driver permits erasing by the stylus of selected text or objects only when the variable is set to a valid number.

In still further preferred embodiments, the eraser indicating signal emitted by the stylus erasing tip is a signal at a predetermined frequency, while the erasing signal output by the stylus erase tip is the predetermined frequency at a particular phase.

This invention further fulfills the above-described needs in the art by providing a method of erasing text or objects from a display screen using a digitizer erasing stylus and corresponding tablet, the method comprising the steps of:

generating an erasing signal with the erasing stylus;

detecting with the tablet the erasing signal and its coordinate data;

selecting text or objects for erasure in response to the erasing signal;

choosing the keystroke function to be used for erasing on the basis of the cursor shape currently being used on the display screen; and erasing in response to the keystroke function the selected text or objects from the display screen in response to the detected erasing signal and corresponding coordinate data.

This invention further fulfills the above-described needs in the art by providing a method of erasing data on a display screen using an erasing stylus and corresponding digitizer tablet, the method comprising the steps of:

a) a user bringing the erasing stylus into sensing proximity of the tablet;

b) causing the stylus to generate an eraser indicating signal which is detected by the tablet;

c) receiving tablet data packets with a driver including stylus coordinate data, eraser data, and switch data;

d) evaluating the switch data and determining whether an eraser switch or threshold has been actuated;

e) when the eraser switch or threshold has been first actuated, simulating a "mouse down" function so as to begin selection of data for erasure, and simulating a "mouse up" function in response to a second eraser switch or threshold actuation so as to end selection of data for erasure; and f) erasing the data selected for erasure by performing a keystroke function after the "mouse up" simulation.

This invention further fulfills the above-described needs in the art by providing in a digitizer eraser system including a stylus, a tablet, a computer, and a display screen, a method of providing user feedback by changing cursor shapes when the stylus enters sensing proximity of the tablet so that the displayed cursor shape is indicative of whether the stylus is a write stylus or an erase stylus, the method comprising the steps of:

a) detecting when the stylus comes into sensing proximity of the tablet;

b) determining whether an eraser indicating frequency is being emitted from the stylus; and c) replacing the current cursor shape with a cursor shape indicative of erasure functionality when it is determined that the eraser indicating frequency is being emitted from the stylus so that the user is informed that the stylus is an erase stylus.

This invention further fulfills the above-described needs in the art by providing a digitizer system for erasing data from a corresponding display screen, the digitizer system comprising:

a cordless stylus for emitting an eraser indicating signal and an erasing signal depending upon actuation of a switch or breaking of a threshold;

a tablet for detecting the signals and determining their coordinates; and wherein the stylus emits the erasing signal between first and second actuations of the switch and otherwise outputs the eraser indicating signal whereby data to be erased from the display screen is selected while the stylus is emitting the erasing signal.

This invention further fulfills the above-described needs in the art by providing in a digitizer system including an eraser stylus, a tablet, a computer, and a display screen, a method of erasing data from the display screen, the method comprising the steps of:

manipulating the eraser stylus over the tablet in order to select data for erasure, the stylus continually emitting an eraser indicating signal;

detecting with the tablet the eraser indicating signal and its coordinates, the coordinates being displayed on the display screen;

sending through an operating system of the computer a message to an addressed window;

intercepting through a subclass procedure positioned between the addressed window and the operating system the message before it reaches the addressed window;

determining with the subclass procedure if the intercepted message originated from the manipulated eraser stylus and tablet;

setting by the subclass procedure the cursor shape being used on the display screen to an erase-indicative cursor shape if the message originated from the eraser stylus and the tablet, and forwarding the new cursor shape to the addressed window for display on the screen; and erasing data selected by the eraser stylus from the display screen.

This invention still further fulfills the above-described needs in the art by providing a digitizer erasing system comprising:

an erasing pointer adapted to be used to select material for erasure from a display screen;

a digitizer tablet for detecting location coordinate data of the pointer;

a computer including a window-based operating system, an application program, and a tablet driver;

the display screen in communication with the computer for displaying the detected pointer coordinate data; and wherein erasure of the selected material from the display screen is performed only when erasing pointer originating messages are addressed to predetermined windows when the application program is not designed for use with the erasing pointer and tablet, whereby the user has the capability of selecting and erasing material from the predetermined windows no matter what type of application program is being used.

This invention will now be described with respect to certain embodiments thereof, along with reference to the accompanying illustrations wherein:

IN THE DRAWINGS

DETAILED DESCRIPTION OF CERTAIN EMBODIMENTS OF THIS INVENTION

Figure 1:
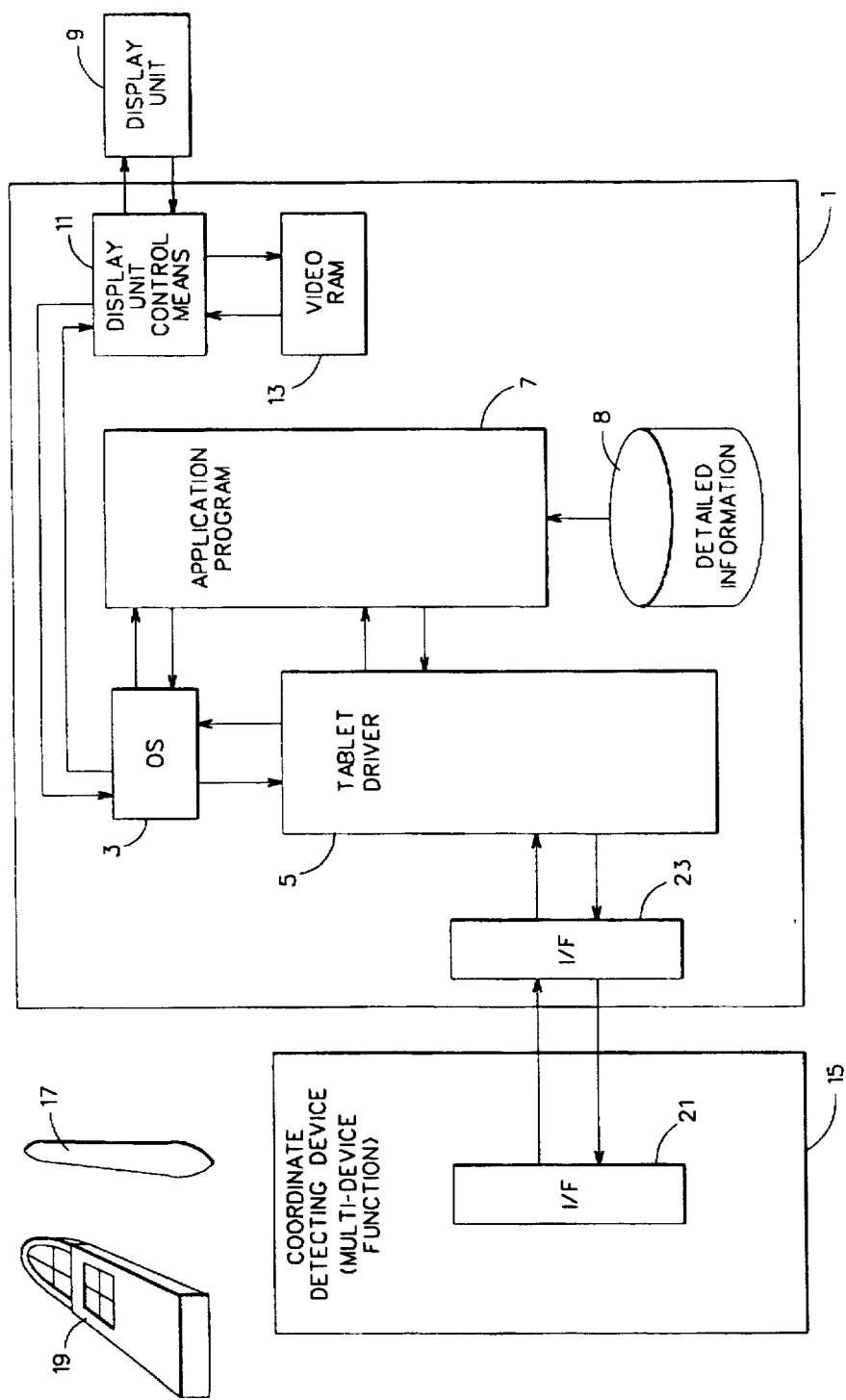
FIG. 1 is a functional block diagram illustrative of an embodiment of this invention wherein the tablet driver, operating system, and application program are disposed in the computer with which the digitizer tablet and corresponding stylus are in communication.

Referring now more particularly to the following illustrations where like reference numerals indicate like parts and/or functions throughout the several views.

FIG. 1 is a functional block diagram illustrative of an embodiment of this invention, this figure schematically illustrating the functions implemented by the CPU of computer 1. Either software (e.g. see microfiche appendix) or hardware may be used to carry out the various functions described and shown herein.

Computer 1 is an information processing apparatus such as based upon the Macintosh or some other personal computer (PC) and work station. Computer 1 (such as a Macintosh with 680XX processor) includes typical computer components including a CPU (not shown), buses (not shown) connected to the CPU, and a memory. Stored in the memory are an operating system (OS) 3, tablet driver 5, application program 7, and optionally detailed information 8 such as tilt data, switch data, high resolution data, etc. The CPU implements application program 7, along with operating system 3 and tablet driver 5 by executing the required programs in accordance with particular situations. The processing of application program 7 along with operating system 3 and tablet driver 5 is shown on display unit 9 (e.g. typical CRT or liquid crystal display screen) primarily by way of display unit controller 11 and video RAM 13, with OS 3 being in communication with display controller 11 and RAM 13 for loading the driver software into RAM 13 instructing controller. RAM 13 is accessed by controller 11 to refresh display screen 9 image.

Coordinate detecting device or digitizer tablet 15 detects the position(s) of electronic pen 17 and/or electronic cursor or puck 19 along with their corresponding emitted frequency and/or switch states. Exemplary methods and systems utilized for detecting the position and switch states of multiple position pointing devices (17 and 19) by tablet 15 and computer 1 are disclosed in currently pending commonly owned U.S. Ser. Nos. 08/388,265 and 08/352,133, the disclosures of which are hereby incorporated herein by reference.

Figure 7A:
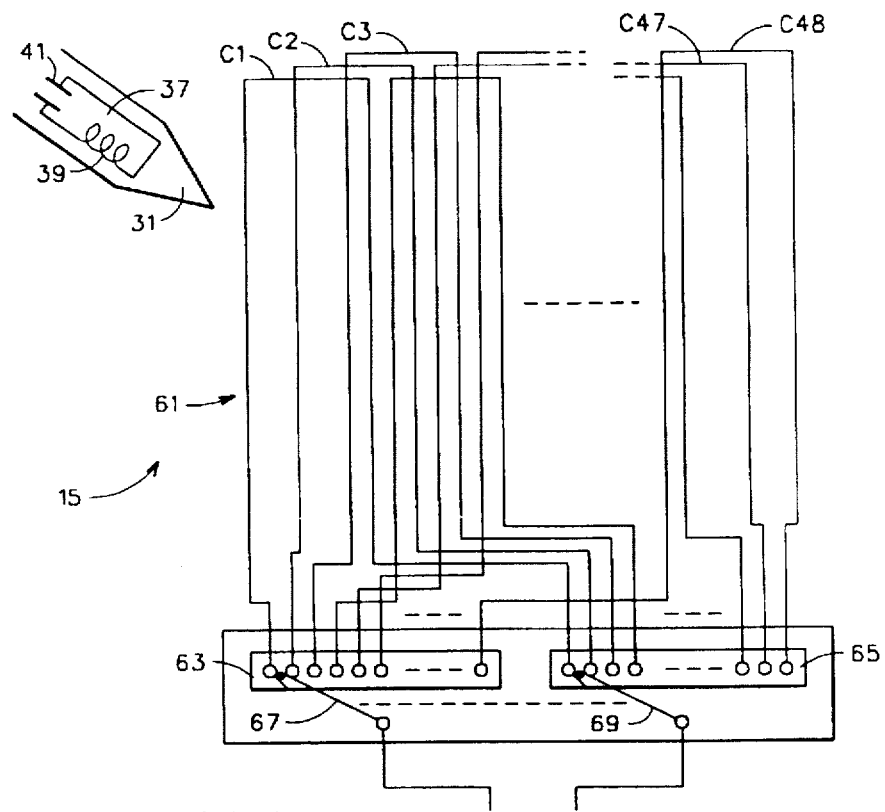
FIG. 7(a) is a schematic view of the digitizer tablet and corresponding erasing stylus according to certain embodiments of this invention.

Coordinate detecting digitizer tablet 15 (see FIG. 7(a)) and computer 1 are connected by way of interface 21 of tablet 15 and interface 23 of computer 1. Application program 7 may (or may not) be designed for use with tablet 15 and stylus 17 according to different embodiments of this invention. In the configuration shown in FIG. 1, tablet driver 5 is intended for use with a single pointing device (e.g. mouse or pen) and is designed to accept coordinate and switch information from only one device. However, when multiple pointing devices such as pen 17 and cursor or mouse 19 are utilized, the system(s) of above-mentioned 08/352,133 and 08/388,265 may be implemented according to certain embodiments.

Operating system 3 is software such as Macintosh, MS-DOS, or MS-WINDOWS (both trademarks of Microsoft, Inc.). Any conventional Macintosh or other PC type operating system (OS) will also suffice. Application program 7 refers to conventional database software, graphic software, spreadsheet software, CAD software, and word processor software. Microsoft WORD™, Excel™, PowerPoint™, Fractal Design Dabbler™, Macromedia Freehand™, Adobe Photoshop™, Adobe Illustrator™, Fractal Design PAINTER™, Wordperfect™, and LOTUS 1-2-3™ are exemplary application programs which may be used in different embodiments of this invention. Application program 7 may or may not be designed for use with digitizer tablet 15 and stylii according to different embodiments of this invention. For example, Fractal Design PAINTER is designed to work with some pen pressure and position data while Wordperfect is not. Both may be used as program 7, because driver 5 is designed to provide the user erasing capability for a variety of application programs.

Tablet driver 5 is a so-called driver device provided for the user by the manufacture of the coordinate detecting device 15 and digitizer system. Tablet driver 5 is often a program installed in computer 1 (via floppy disc for example) for the purpose of transferring coordinate information, switch information, frequency information, and other detailed information from stylus coordinate detecting digitizer tablet 15 to operating system 3 or application interface layer (API) or application program 7. This transfer includes not only the active transfer of data but also passive transfer which enables application program 7 or the like to obtain the data. Since these three programs are software, it is possible to incorporate a part of each of their functions in other programs. For example, all functions of tablet driver 5 could be included in application program 7.

When an operator or user performs a coordinate input by way of erasing/writing stylus 17 or cursor pointer 19, the operator visually checks the contents shown on display screen 9. The interactive input is primarily governed by application program 7. Taking the pointing input in a graphic processor (CAD) as an example, if a pointed position is in a drawing area, then the application program 7 displays the pointer indicating the pointed-to position (e.g. via a cursor shape such as an arrow or a cross) on screen 9. If the pointed-to position is in the menu display area of Microsoft WORD for example, then application program 7 portrays an "arrow-shaped" cursor, for example, and may highlight the pointed to menu item by reversing, for example, the black and white in the case of a monochrome display unit or changing a color of a pointed to area in the case of a color display unit.

While observing screen 9, the operator or user moves a pointing device (17 or 19) to select the desired point or menu item and when a desired position is reached, the operator may turn on a stylus switch (e.g. stylus side switch or pressure switch) for the purpose of either writing, selecting, dragging, erasing, etc. Driver 5 and application program 7 receive switch data, frequency data, and coordinate values and process them through operating system 3 so that processed information responsive thereto is output on display unit 9.

Application program 7 according to certain embodiments of this invention may not be designed to work with tablet 15 and stylus 17. The provision of driver 5 in such embodiments gives the user enhanced capabilities (e.g. ability to erase text or objects from screen 9 via stylus 17 and tablet 15) related to the digitizer and functions to permit the application program to be used in conjunction with tablet 15 and the pointer devices 17 and 19. Driver 5 functions so that, for example, OS 3 and/or the application program think that stylus 17 is a "mouse" and thus all signals from stylus 17 are caused to simulate conventional mouse "up" and "down" button signals.

Because OS 3 does not recognize stylus and tablet data (e.g. tilt detection, pressure switch data, etc.) in certain embodiments, such detailed data is stored at 8 for later retrieval by application program 7. For example, high resolution stylus position data, stylus pressure and tilt data, switch data, and stylus eraser data are stored in detailed information area 8 for later retrieval.

Figure 2:
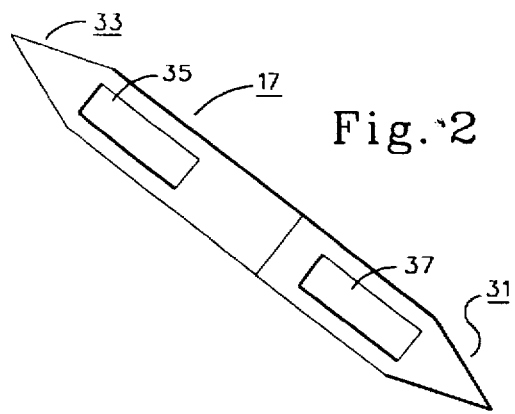
FIG. 2 is a schematic view of a double-tipped stylus which may be used according to certain embodiments of this invention, one tip for writing and the other for erasing.

FIG. 2 illustrates cordless digitizing pen or stylus 17 which has an erasing end 31 and a writing end 33. Parallel resonance tuning circuit 35 (see FIG. 4) is provided for allowing writing tip 33 to emit a plurality of different writing frequencies (e.g. frequencies A, B, and C) and phases. Separate and distinct from writing circuit 35 is eraser tuning circuit 37 of FIG. 3 which is provided in erasing tip 31 of stylus 17.

According to certain embodiments, eraser tip 31 is used to select and delete text, cells, or other objects displayed on screen 9 from OS 3 and/or application program 7 with one stroke. In one motion, the user presses the pen 17 down to the tablet 15 to select text for erasure, moves the pen 17 (i.e. tip 31) across the text to be erased, and at the end of the selection then lifts the tip 31 off the tablet 15 to cause the selection to be erased.

Figure 3:
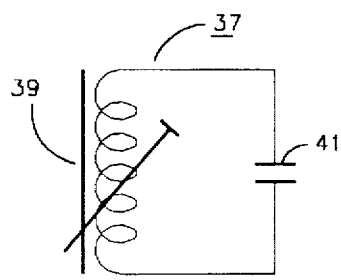
FIG. 3 illustrates a variable circuit used for causing the erasing tip of the stylus of FIG. 2 to emit an erasing frequency at different phases according to certain embodiments of this invention.
Figure 4:
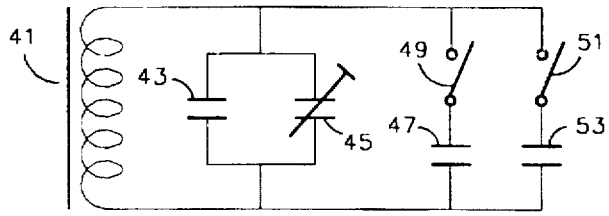
FIG. 4 illustrates a tuning circuit to be used for causing the writing tip of the stylus of FIG. 2 to emit different writing frequencies and phases according to an embodiment of this invention.

Eraser circuit 37, shown in FIG. 3, includes variable coil 39 and capacitor 41. Both ends of coil 39 are connected to capacitor 41 which is charged by the tablet. Variation (in order to change the phase of the frequency) of coil 39 and thus the phase output by circuit 37 is caused by the amount of pressure applied to the surface of tablet 15 by erasing tip 31 according to certain embodiments of this invention. Should a predetermined pressure threshold be exceeded, then circuit 37 is caused to emit the frequency at a predetermined phase (erasing signal) indicative of selection of material for erasure. In other words, circuit 37 emits an eraser indicating signal when the pressure threshold is not broken by the user (e.g. when tip 31 is not in contact with the tablet or is lightly in contact therewith below the pressure threshold) and an erasing signal (particular phase of the frequency) when the user presses tip 31 against the tablet and causes the threshold to be broken. Thus, when the amount of pressure on tip 31 is above a predetermined threshold, material passed over by tip 31 is selected for erasure and is subsequently removed from screen 9 when the amount of pressure falls below the threshold because tip 31 is lifted from tablet 15. Alternatively, circuit 37 may instead utilize a fixed coil and a variable capacitor. The threshold value which causes circuit 37 to begin emitting the erasing signal (frequency with predetermined phase) may be adjusted by the user according to user preference. While the eraser indicating signal emitted from circuit 37 is at a predetermined frequency according to certain embodiments, any other conventional signal which identifies eraser tip 31 will suffice.

Accordingly, erase circuit 37 continually emits an eraser indicating signal which is at a predetermined frequency, and an erasing signal which is at a specific phase if the frequency determined by variation in coil 39 as the tip pressure threshold, for example, is broken.

Writing tuning circuit 35 (see FIG. 4) is a parallel tuning circuit composed of coil 41, capacitor 43 and variable capacitor 45 (e.g. tip pressure sensitive switch). Tuning circuit 35 (and circuit 37) has a resonant frequency capable of tuning with the frequency generated from the sensing coil(s) of the tablet when electric power is applied to the sensing coil(s). Both ends of coil 41 are connected to capacitor 47 through first optional switch 49 (e.g. a first side switch), so that the frequency of the electromagnetic wave of tuning circuit 35 is changed when first switch 49 is turned on. In addition to first switch 49, optional second switch 51 (e.g. a second side switch) and corresponding capacitor 53 may be connected in parallel to the first switch so that the frequency of the electromagnetic wave for writing tuning circuit 35 is changed when second switch 51 is turned on or actuated. Second switch 51 is arranged along the exterior of stylus 17, as is switch 49 at, for example, a position to which a finger of the operator can easily touch and actuate when the operator is handling stylus 17 (see FIG. 7(b)).

For example, write circuit 35 may emit frequency "A" (e.g. 531 kHz) when switches 49 and 51 are open, frequency "B" (e.g. 562 kHz) when switch 49 is closed and switch 51 is open, and frequency "C" (e.g. 590 kHz) when switch 49 is open and switch 51 is closed. According to certain embodiments of this invention, erase circuit 37 also emits frequency "C" (as its eraser indicating signal) which is the same frequency emitted by circuit 35 when switch 49 is open and switch 51 is closed. Difficulties arising from both the write and erase circuits being capable of emitting the same frequency for different reasons are overcome as set forth in FIG. 13 and the corresponding description discussed below.

FIG. 7(a) illustrates X-direction detecting unit 61 of digitizer tablet 15 along with erasing tip 31 of pen 17. The X axial direction detecting unit 61 includes a plurality of sensing coils $C_1$, $C_2$, $C_3$, ... $C_{47}$, and $C_{48}$ which are composed of loop conductors partially overlapped and arranged in parallel with each other in the X axial direction. The longitudinal direction of these coils is oriented in the same direction; i.e. Y direction. Although this embodiment shows the X direction detecting units 61 including forty-eight sensing coils, the present invention is not limited to this number and also includes Y direction coils as is known in the art. For example, tablet 15 may receive five frequencies, three from pen 17 and two from puck 19.

One end of the sensing coils is connected to first terminal unit 63 and the other end is connected to second terminal unit 65. One terminal of first unit 63 is selectively connected to first selecting terminal 67 with the other terminals being free. Terminal 67 is connected to only one terminal of unit 63 at a time and successively scans the terminals. A second selecting terminal 69 is linked with first selecting terminal 67 so as to connect to the other end of the sensing coil(s). First and second terminal units 63 and 65, and first and second selecting terminals 67 and 69, constitute a selective circuit. In such a manner, sensed coordinates, frequencies, and switch data are output from tablet 15 via interface 21 to tablet driver 5 disposed in computer 1.

Figure 7B:
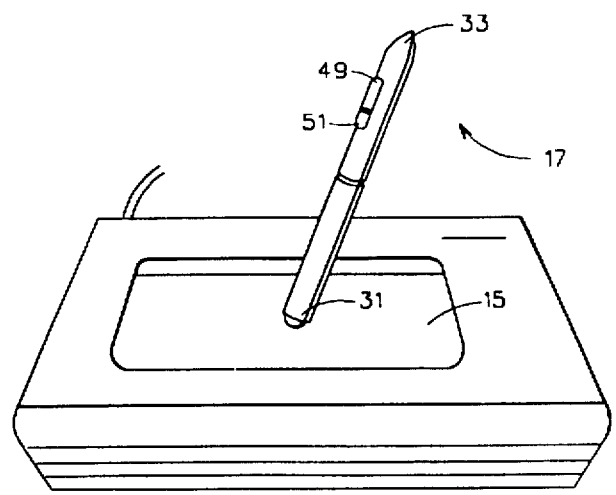
FIG. 7(b) is a perspective view of the erasing/writing stylus or pen (of FIGS. 2 and 7(a)) being used in conjunction with the tablet.

FIG. 7(b) illustrates the use of stylus 17 (including erase tip 31 and write tip 33) in conjunction with tablet 15. In this figure, erase tip 31 is within sensing proximity of tablet 15 while write tip 33 is outside proximity. Switches 49 and 51 of stylus 17 are shown here as side switches to be selectively actuated by a finger of the user.

The digitizer system according to certain embodiments of this invention compensates for tilt of both tips 31 and 33 in accordance with the tilt detection and compensation system set forth in commonly owned 08/421,270, the disclosure of which is hereby incorporated herein by reference. The tilt compensation system for both the writing and the erasing tips of stylus 17 detects a first distribution of an induction voltage in the X axial direction and a second distribution of induction voltage in the Y axial direction. Both main and auxiliary peaks are used to compensate for tilt. See U.S. Ser. No. 08/421,270 for further details of the stylus tilt detection and compensation.

Figure 5:
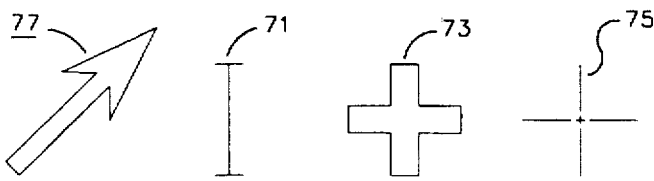
FIG. 5 illustrates four non-erasing indicating typical cursor shapes to be displayed on the screen according to certain embodiments of this invention when the system is not in an erase mode.
Figure 8:
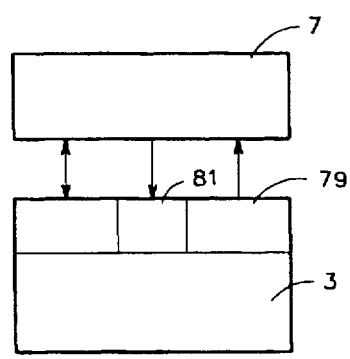
FIG. 8 is a functional block diagram illustrative of how cursor shapes are retrieved and set according to certain embodiments of this invention.

FIG. 8 is a functional block diagram illustrating communication between application program 7 and operating system 3 for the purpose of changing cursor shapes on display screen 9. Let us assume, for example, that computer 1 is a Macintosh or other PC and application program 7 is Microsoft Word, Wordperfect, and/or Fractal Design PAINTER. Different application programs are interchangeable. In such cases, a plurality of different cursor shapes are possible, such possible cursor shapes depending upon the application program in use and the screen being used by the operator. Exemplary possible cursor shapes are illustrated in FIG. 5. For example, "I-beam" cursor shape 71 is used in different application programs to enter and edit text. On the other hand, when the user enters and edits cells where data is represented in arrays (e.g. spreadsheets) in certain application programs, a "large +" 73 is representative of the cursor shape illustrated on the display screen. "Thin +" cursor shape 75 is used in certain programs 7 for graphic applications such as drawing. Finally, an "arrow" cursor shape 77 is portrayed on display screen 9 in many such programs 7 when the user is conducting general navigation, such as pulling down menus and scrolling documents. Thus, the cursor shape or shapes being portrayed on display screen 9 change depending upon what environment the user is in and what the user is doing.

According to certain embodiments of this invention, the system allows tip 31 to erase text and objects from screen 9 when, for example, cursor shapes 71, 73, 75 (and thus shapes 100, 102, 104) are being used (regardless of what application program 7 is being used), but not when shape 77 is on the screen. Accordingly, the user is prevented from erasing material from screen 9 when cursor shape 77 is being used. This prevents, for example, data in a document on the screen, such as a character preceding an insertion point or a drawing object currently selected, from being erased or deleted (intentionally or accidentally).

As shown in FIG. 8, cursor shapes on the display screen are changed by application program 7 first retrieving cursor shape data from operating system 3, often by requesting a standard shape from operating system 3 by a call to "Get Cursor" 79 after which the requested cursor shape is forwarded to the application program. The cursor shape is then set by passing the retrieved or requested cursor shape to operating system 3 by a call to "Set Cursor" 81.

Figure 9:
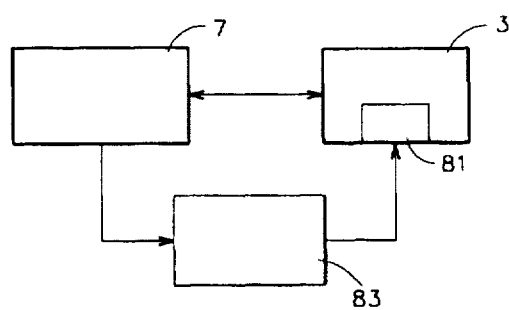
FIG. 9 is a block diagram illustrating a patch routine disposed between the application program and the operating system, the patch routine for monitoring display screen cursor shape requests and settings.

By using patch routine 83 of FIG. 9 to interrupt or monitor the normal flow of cursor shape data calls between application program 7 and operating system 3, it is possible to monitor the cursor shape action that application program 7 is taking so as to provide user feedback and prevent erasure under certain circumstances as will be discussed below. As shown in FIG. 9, a possible position for patch routine 83 is between application program 7 and operating system 3, so that patch routine 83 interrupts and monitors the setting of all cursor shapes. Alternatively, patch routine 83 could be positioned so as to monitor and intercept all requests (as opposed to "sets") for shapes by application program 7.

Figure 10:
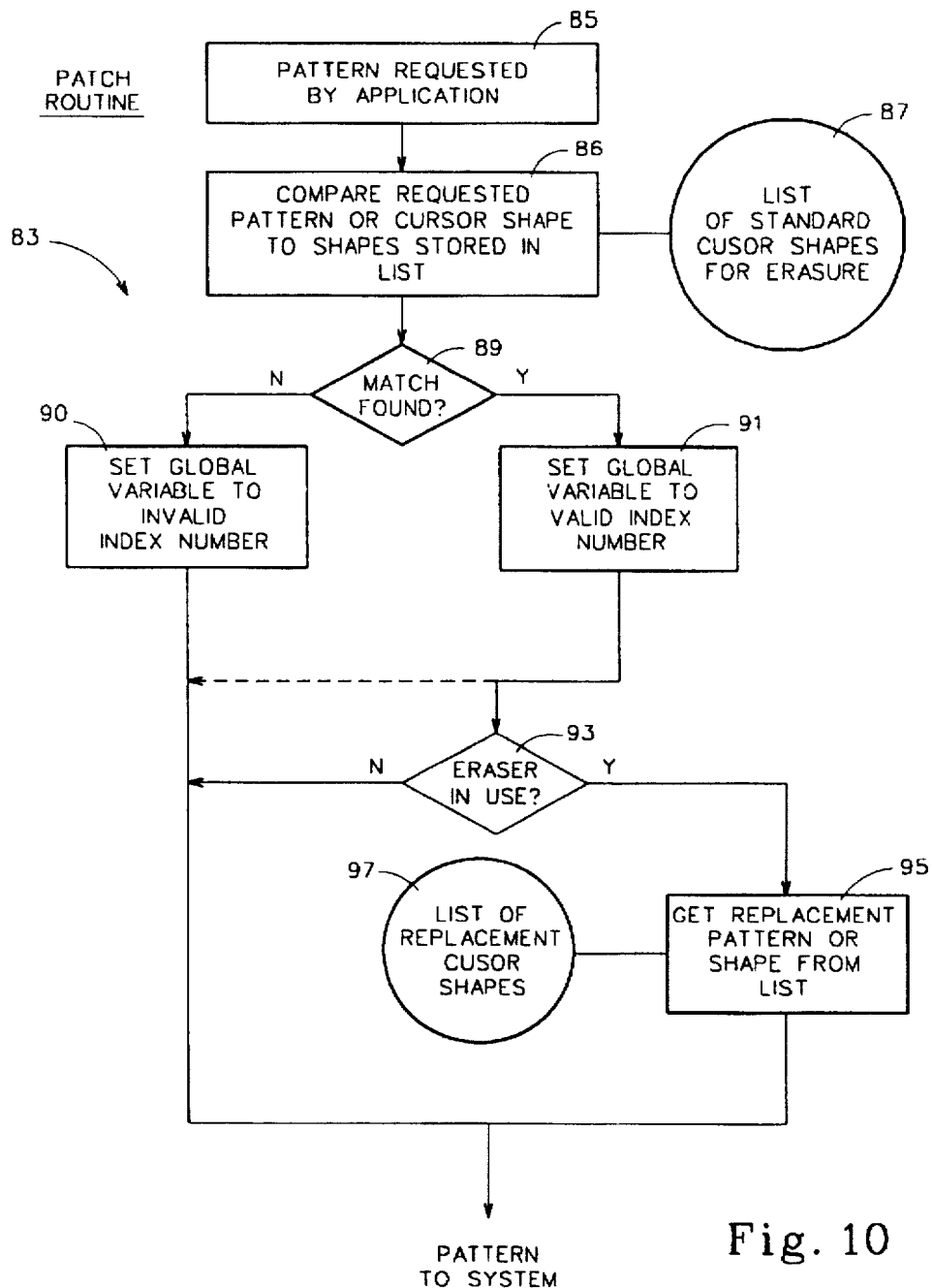
FIG. 10 is a functional flowchart illustrative of the patch routine of FIG. 9, this flowchart indicating the setting of a global variable in response to the setting of a cursor shape.

Patch routine 83 is further illustrated in FIG. 10 by way of a flow chart. To begin with, the cursor shape or pattern is first requested by application program 7 in step 85. As patch routine 83 interrupts the flow of cursor setting calls from application program 7 to the operating system 3, the cursor shape to be set is compared in step 86 to a list 87 of cursor shapes (or alternatively windows in certain PC-based applications set forth in FIGS. 16 and 17) for which erasure is acceptable. In other words, the system will allow the user to manipulate erase tip 31 of stylus 17 to select and erase text or objects from display screen 9 when, and only when, one of the cursor shapes in list 87 is being shown or used on screen 9. "Arrow" cursor shape 77 is not included in list 87 according to certain embodiments where cursor shapes 71, 73, and 75 are included in list 87 so that erasure is not permitted when "arrow" shape 77 is being used on screen 9 (no matter what application program 7 is being used). Accordingly, erasure is prohibited during navigation by the user. In such a manner, no matter what application program is in use, the user can erase text, objects, or the like from screen 9 when one of shapes 71, 73, or 75 (100, 102, 104), but not shape 77, is in use. Accordingly, erasure is permitted according to this format even when the application program in use is not designed for use with a cursor and tablet for erasing.

Next, in step 89, tablet driver 5 checks to see if a match was found between the cursor shape to be set and the shapes stored in list 87. If no match is found, then in step 90 tablet driver 5 sets a global variable to an invalid index number (e.g. a negative number or zero). However, if the cursor shape to be set is listed in list 87, then tablet driver 5 sets the global variable to a valid index number (e.g. 1) in step 91. For example, positive numbers may be valid index numbers and negative numbers may be classified as invalid index numbers according to certain embodiments of this invention. As will be seen below, erasure of text and objects by stylus erasing tip 31 is permitted when the global variable is set to a valid index number, but is not permitted when the variable is set to an invalid index number so as to allow the stylus to erase only when the cursor shapes in list 87 are being used on screen 9.

If the variable is set to a valid index number in step 91, then driver 5 next determines whether or not eraser tip 31 and circuit 37 are emitting an eraser indicating signal, such as an eraser indicative frequency (e.g. frequency "C") in step 93. If such a frequency is being generated by circuit 37 and is being detected by tablet 15, then the eraser is found to be in use. However, if a non-erasing (e.g. writing) frequency being emitted by circuit 35 is detected by the tablet, then the eraser is assumed to be not in use in step 93. As illustrated, when in step 93 the eraser is found to be in use, the requested cursor shape to be set (e.g. from FIG. 5) is replaced by another or new cursor shape (see FIG. 6) which is indicative of erasing in step 95 from list 97.

Figure 6:
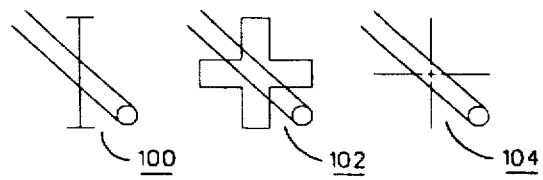
FIG. 6 illustrates three of the cursor shapes of FIG. 5 in their erase-indicative shapes which inform the user that an erase mode is in effect for the system.

A plurality of erasure indicative cursor shapes (see FIG. 6) are stored in list 97. Thus, when the eraser is found to be in use in step 93, driver 5 replaces the conventional requested cursor shape (e.g. 71, 73, or 75) with a corresponding erasure indicative cursor shape stored in list 97. For example, if the requested cursor shape is "I-beam" 71, then this cursor shape is replaced in step 95 by "erasure I-beam" 100 (see FIG. 6) which is stored in list 97. Likewise, if the requested cursor shape was a "large +" 73 (see FIG. 5), then in step 95, this cursor shape is replaced with an "erasure large +" 102 (see FIG. 6). Finally, if the requested cursor shape was "thin +" 75 (see FIG. 5), then it is replaced in step 95 by erasure cursor shape 104 which is an "erasure thin +". There is no corresponding erasure-indicative cursor shape for arrow 77 because erasing is not permitted when shape 77 is in use according to certain embodiments. Erasure cursor shapes 100, 102, and 104 illustrated in FIG. 6 are stored in list 97. All cursor shapes shown in FIG. 6 and thus stored in list 97 have erasers 105 laid over the underlying conventional cursor shapes for user feedback purposes.

According to certain embodiments of this invention, an "eraser" cursor shape (not shown) which is used in certain eraser designed application programs 7 would not be stored in list 87, because there is no need in such embodiments to override the application program which in such cases is designed for use with erase tip 31 and tablet 15.

After step 95, the new or replacement eraser cursor shape 100, 102, or 104, is forwarded to operating system 3 for setting and subsequent display and user manipulation on screen 9. Accordingly, the user is able to determine whether or not the system is in an "erase" mode simply by viewing the cursor shape on screen 9. If one of the shapes of FIG. 6 is being shown on the screen, then the user knows that circuit 37 is in proximity to the tablet 15 and is emitting an erase frequency (e.g. frequency "C"). However, if one of the shapes shown in FIG. 5 is being shown and manipulated on screen 9, then the user knows that circuit 35 is within proximity of the tablet and emitting writing frequencies or alternatively that the stylus is not adjacent the tablet.

Going back to step 86 in FIG. 10, it is noted again that list 87 only contains cursor shapes which allow erasibility. According to certain embodiments of this invention, "arrow" cursor shape 77 is not placed in list 87. However, cursor shapes 71, 73, and 75 are in lists 87. Thus, erasing is not possible when "arrow" cursor shape 77 is on the display screen, whereby during general navigation, such as pulling down menus and scrolling documents, the user cannot erase information because "arrow" cursor shape 77 is being displayed. Then in accordance with patch routine 83, when the requested cursor shape is "arrow" 77, no match is found in step 89 and the global variable is set to an invalid index number in step 90 with "arrow" cursor shape 77 subsequently being forwarded to the operating system for setting and thereafter to the display screen 9. In accordance with certain other embodiments of this invention, cursor shapes other than "arrow" cursor shape 77 may be designated as non-erasing cursor shapes and thus not be stored in list 87.

Figure 16:
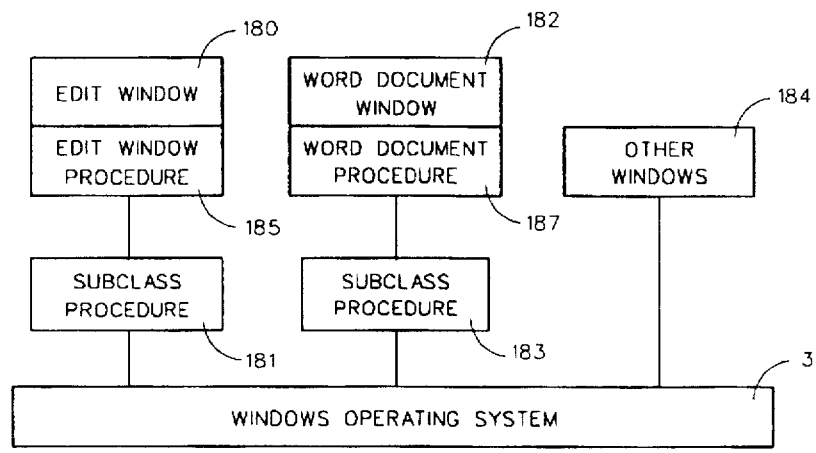
FIG. 16 is a functional block diagram of a PC-based MS-WINDOWS™ embodiment of this invention.
Figure 17:
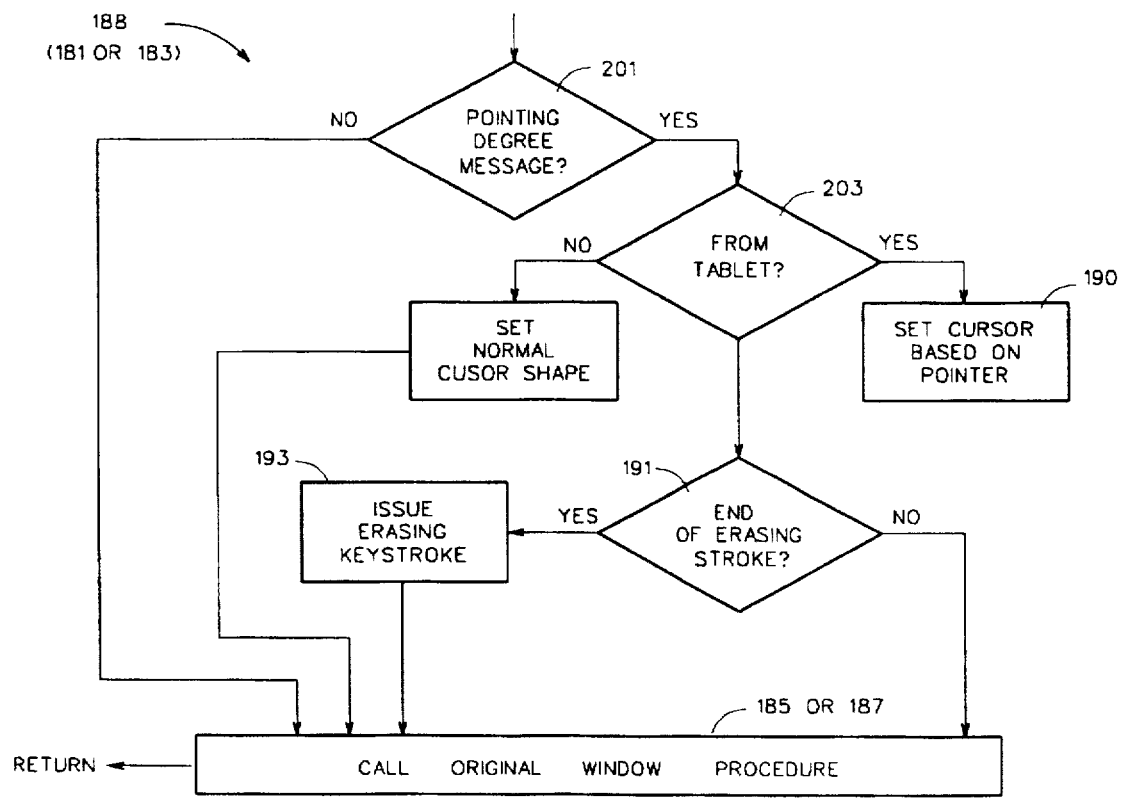
FIG. 17 is a flowchart of a "subclass" procedure from the FIG. 16 embodiment.

According to certain other PC-based embodiments of this invention, the permitting of erasing via tip 31 may be based on the window being used as opposed to the cursor shape. In such cases, list 87 would in effect contain a plurality of different windows for which erasing is acceptable. Thus, erasing would not be permitted for unlisted windows. FIGS. 16–17 provide a more detailed description of this embodiment.

Figure 11:
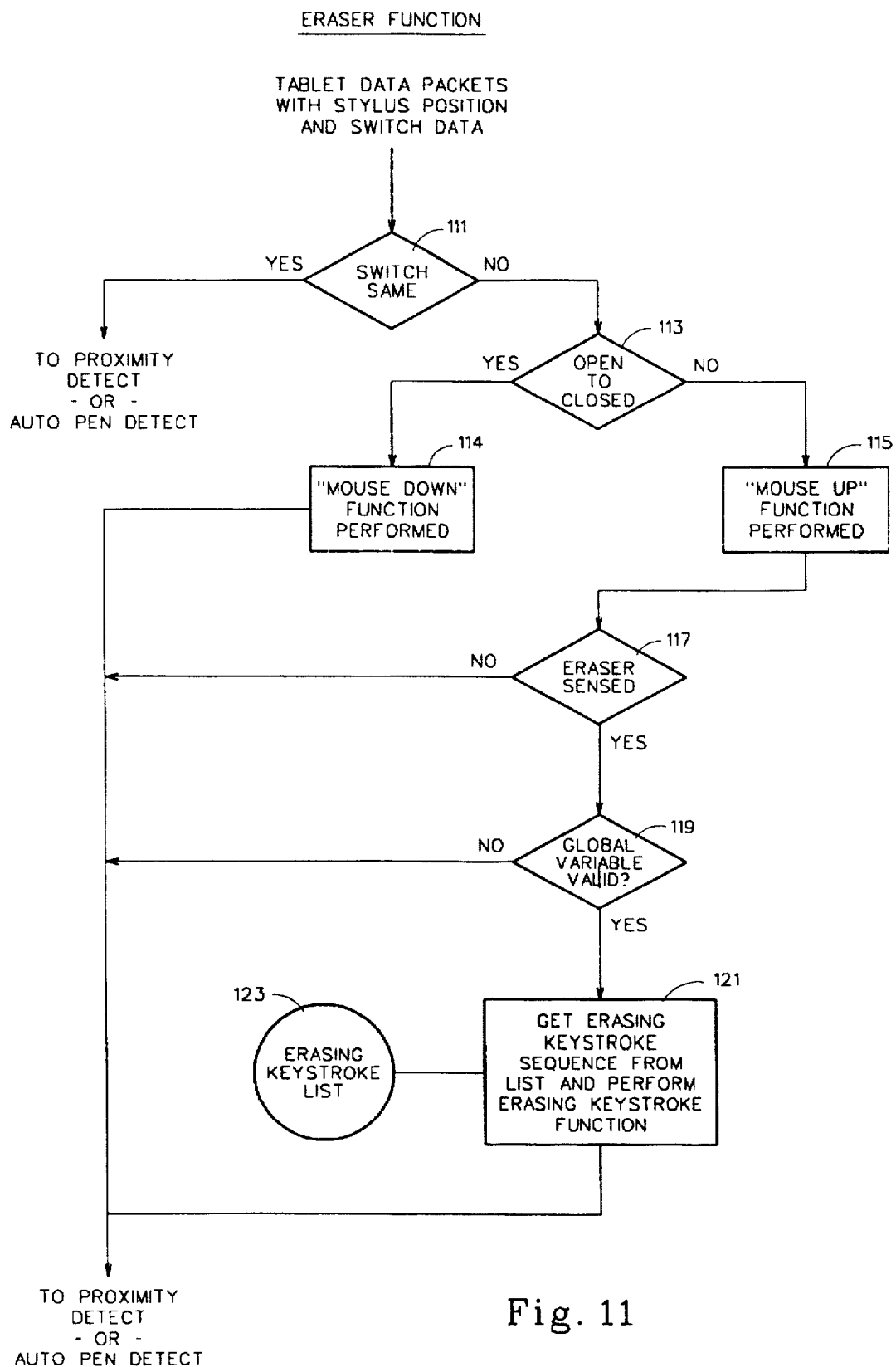
FIG. 11 is a functional flowchart of the eraser function according to certain embodiments of this invention.

FIG. 11 is a flowchart illustrating the erasing function of the digitizer system set forth in FIG. 1 according to certain embodiments of this invention. To start with, driver 5 receives data packets from digitizer tablet 15 indicative of the position or coordinate of stylus 17 and of stylus frequency and switch data. In step 111, driver 5 determines whether or not the switch data received is the same as the switch data received in the previous packet or group of packets. If the switch data is the same, then the packets are sent to proximity detect which will be discussed below. However, if there is a change in the switch data (a switch has been opened or closed or a threshold has been broken in either direction), then driver 5 moves to step 113 where it is determined whether or not the switch orientation was changed from open to closed or alternatively from closed to open. Although not illustrated in the flowchart of FIG. 11, step 113 may also be utilized to determine whether a threshold (e.g. tip pressure threshold) was broken going in the upper or lower direction.

If it is found in step 113 that the switch was changed from an open state to a closed state, then the driver simulates a "mouse down" function in step 114. However, if the switch went from a closed to an open state, then the driver simulates a "mouse up" function in step 115. Thus, depending on how the switch data changes, either a "mouse up" function is simulated in step 115 or a "mouse down" function is simulated in step 114. When driver 5 simulates, for example, a "mouse up" function, the operating system and/or application program 7 are made to believe in certain embodiments that a conventional mouse button switch has been released. A "mouse down" simulation imitates the mouse button switch being depressed.

If the "mouse down" occurs in step 114, the system then goes to proximity detect. However, if the "mouse up" function is performed, then step 117 is performed by the tablet driver for the purpose of determining whether the erase frequency from tip 31 is being detected by tablet 15. In other words, driver 5 in step 117 determines whether an appropriate erasing frequency is being emitted from circuit 37 or alternatively whether a non-erasing frequency (or no frequency at all) is being emitted from circuit 35. If, in step 117, driver 5 detects that circuit 37 is emitting an erasing frequency via coil 39, then the driver determines in step 119 whether the global variable (see patch routine 83) is set to a valid or an invalid index number. If the variable is set to an invalid index number then the system goes to proximity detect. However, if the variable has been set to a valid number in patch routine 83, then an erasing keystroke sequence is performed in step 121. In step 121, driver 5 selects an appropriate erasing keystroke (from a group of possible erasing keystrokes stored in list 123), based upon the cursor shape in use and thereafter performs erasing by way of causing the selected erasing keystroke function to be performed on the selected text or object. The term "keystroke function" means that a keyboard keystroke is simulated by the system in order to erase or remove text (or an object) from the display screen.

A plurality of different possible erasing keystroke functions are stored in list 123. The erasure function is performed by simply sending the keystroke selected and retrieved from list 123 to the operating system 3 through standard key down functions. Exemplary erasing keystrokes stored in list 123 include a "delete" keystroke, a "backspace" keystroke function which usually deletes, a "cut" (control X or command X keystroke) which typically removes, and a combination "space-backspace" which typically replaces or inserts a space and subsequently removes the space character. Because certain erasing keystrokes stored in list 123 may cause complications when used in certain environments, different erase keystrokes are provided for different environments based upon the cursor shape being used. For example, a "control X" command may perform a function other than deleting or removing selected data when used in certain environments; or alternatively a "delete" keystroke may be acceptable in situations whereas a "backspace" key function would not be acceptable in such situations for erasing. Accordingly, in step 121, driver 5 picks an erasing keystroke from list 123 based upon the cursor shape currently in use. For example, when I-beam cursor shape 100 is in use, then a "space-backspace" erasure key function is selected from list 123. When a "Thin +" cursor shape 104 is in use, a "backspace" erasure key function is selected from list 123. When shape 102 is in use, a "delete" keystroke function is selected from list 123. Therefore, acceptable erasure key functions are performed in all environments by selecting an erasure key function from list 123 in accordance with the last requested or set cursor shape.

Figure 12:
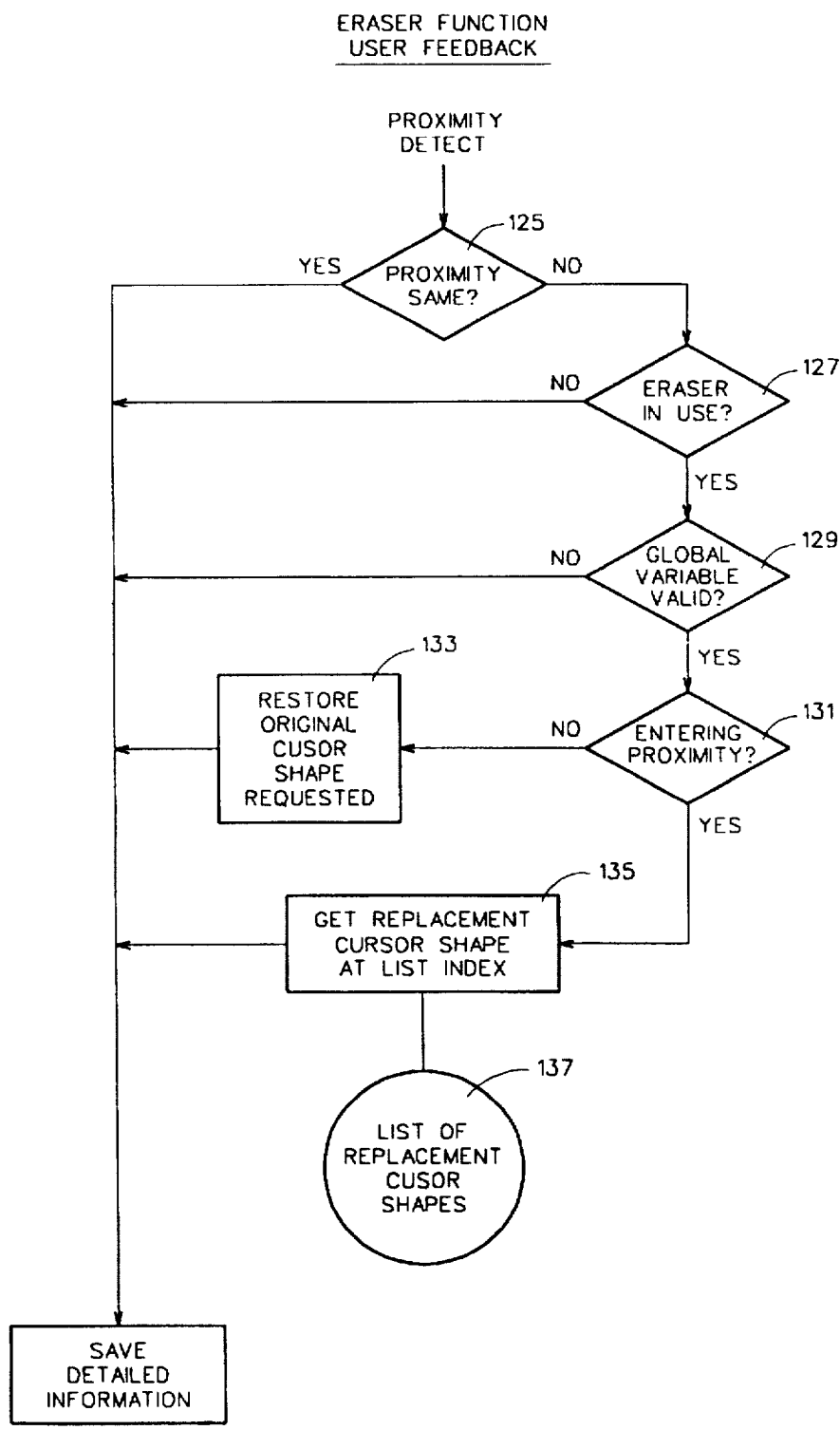
FIG. 12 is a functional flowchart illustrative of an eraser function user feedback system according to certain embodiments of this invention.

FIG. 12 is a flowchart illustrative of another erasure function user feedback system according to certain embodiments of this invention. This feedback system manipulates the cursor shape being shown on screen 9 so that it is indicative of whether or not the system is, for example, in a writing or an erasing mode. This system may be used in combination with step 121 of FIG. 11 according to certain embodiments.

The FIG. 12 system starts with proximity detection step 125. In step 125, tablet driver 5 determines whether there has been a proximity change (i.e. whether stylus 17 has come into or left the sensing proximity of tablet 15). When the proximity is the same as in the last packet or group of packets received from the tablet, then the system bypasses the remainder of the FIG. 12 flowchart. However, if cursor 17 either enters the sensing proximity of tablet 15 or leaves the sensing proximity of tablet 15, then step 127 is performed.

In step 127, driver 5 determines whether an eraser indicating signal (e.g. 590 kHz) is being detected by the tablet from tip 31. If circuit 35 is emitting a writing frequency (or some other type of writing indicating signal), then the answer to this query is "no" and the remainder of the flowchart is bypassed. However, if circuit 37 is emitting an erasing frequency which is detected by tablet 15, then step 129 is performed where the global variable is analyzed to see whether it is set to a valid or an invalid index number. When the global variable (see patch routine 83) is found to be set to a valid index number in step 129, then step 131 is performed where the driver determines whether stylus 17 is entering sensing proximity or leaving the sensing proximity of the tablet. If it is found in step 131 that stylus 17 is leaving the sensing proximity of tablet 15, then the cursor shape is restored to the originally requested or set cursor shape (see FIG. 5) in step 133 and the remainder of the flowchart is bypassed. In other words, if it is found that stylus 17 is leaving the sensing proximity of tablet 15, then one of the FIG. 5 cursor shapes is set in step 113 so that the cursor shape displayed on screen 9 is indicative of a non-erasing (e.g. writing) mode.

If, however, it is found in step 131 that stylus 17 is entering the sensing proximity of tablet 15, then the last requested FIG. 5 cursor shape is replaced with a corresponding FIG. 6 cursor shape in step 135 so that the user is informed that an erasing mode is in effect and tip 31 is capable of erasing. In other words, because the eraser was found to be in use in step 127, the global variable was found to be valid in step 129, and the stylus is entering tablet sensing proximity in step 131, then it is assumed to be in an erase mode and step 135 is performed to inform the user of such by displaying an erasure cursor shape (100, 102, or 104) on display screen 9. The FIG. 6 shapes 100, 102, and 104 or the like are, of course, stored in list 137 for retrieval by the driver in step 135. According to certain embodiments, lists 97 and 137 are identical in content.

Figure 13:
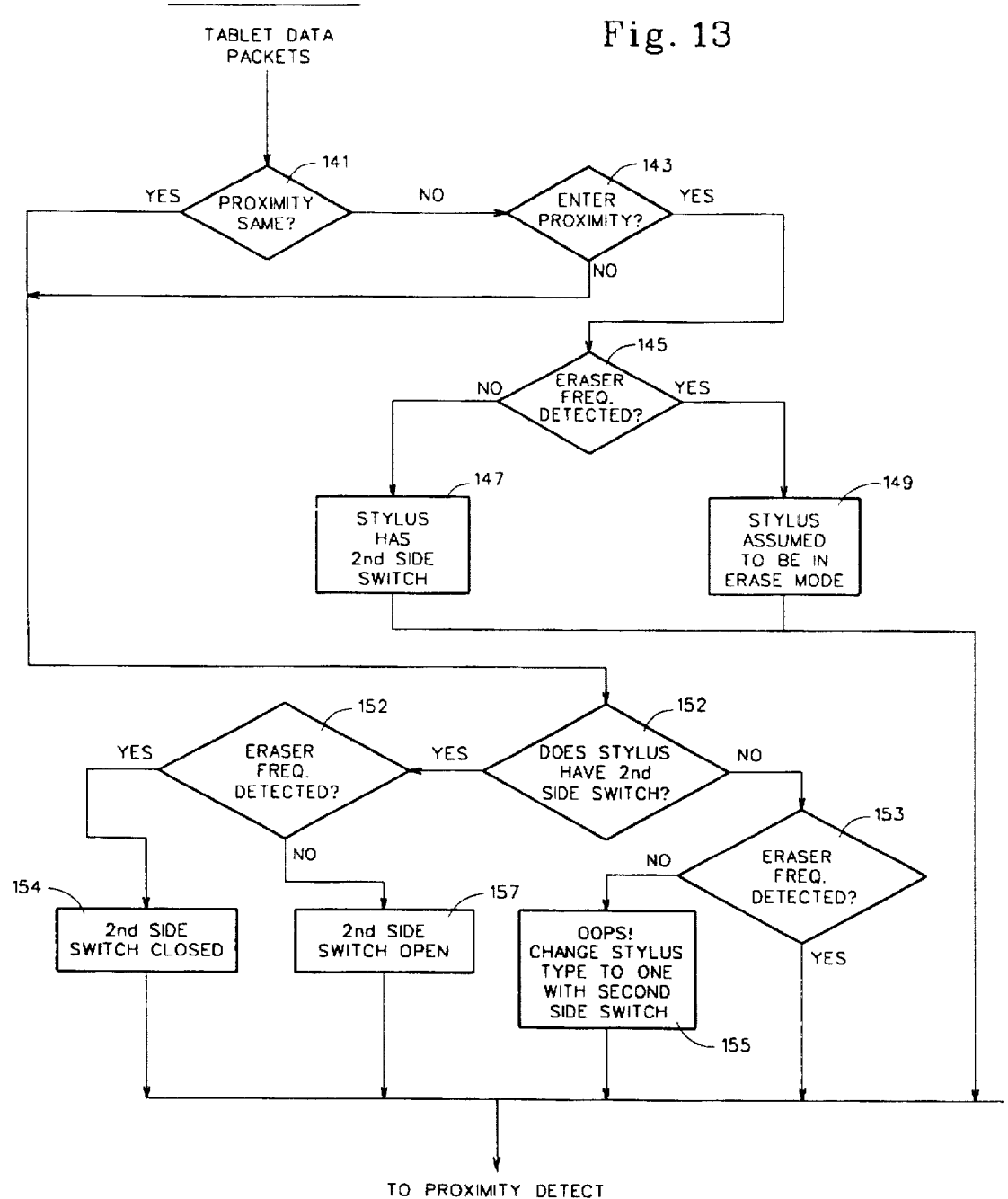
FIG. 13 is a functional flowchart illustrative of an automatic pen-type detection system for detecting whether a pen coming into the sensing proximity of the tablet is an erasing tipped pen or a writing tipped pen.

FIG. 13 is a flowchart illustrative of the auto-pen detect system according to certain embodiments of this invention. This system functions to automatically determine (by way of an educated guess) upon sensing entry of stylus 17 within proximity of tablet 5 whether writing tip 33 or erasing tip 31 is in sensing proximity. This is adapted to be used when erase circuit 37 and write circuit 35 are both capable of emitting the same (or similar) frequency (e.g. frequency "C" discussed above). This may occur, for example, when the operating system 3 and/or application program 7 have an upper limit of 3 different frequencies which may be output by stylus 17. In such a case, it is often desirable to allow writing tip 33 to emit three different frequencies (i.e. frequencies A, B, and C discussed above) for various functions. Because stylus 7 can only utilize three different frequencies, then the erase frequency generated by circuit 37 must necessarily be the same as one (e.g. frequency C) of the frequencies generated by write circuit 35. Accordingly, tips 31 and 33 are capable of emitting the same frequency (e.g. frequency C). It is desirable in such situations, when frequency "C" is being emitted by the stylus, for the system to be able to determine whether the writing tip or alternatively the erasing tip is in sensing proximity to tablet 15. The system according to the FIG. 13 flowchart functions to solve and overcome this problem.

The auto-pen detect system begins with tablet driver 5 receiving data packets from tablet 15 which are indicative of stylus position, switch data, and frequency. In step 141, the driver determines whether stylus 17 has left or entered tablet sensing proximity, or alternatively if the proximity of the stylus has remained the same. If no change in proximity has occurred, then the data packets go to step 151. If stylus 17 has either entered or left the tablet sensing proximity, then step 143 is performed to determine whether the stylus has "entered" tablet sensing proximity. If the stylus has "left" sensing proximity, then the packets go to step 151 or alternatively the remaining steps are bypassed. However, if stylus 17 has entered sensing proximity, then driver 5 determines in step 145 whether the erase frequency (no matter what the phase) is being detected by the tablet. In the situation outlined above where writing circuit 35 and erasing circuit 37 are capable of emitting the same frequency, the "erase" frequency detected in step 145 may be the common frequency (e.g. frequency "C" hereinafter) capable of being output by both circuits.

If it is determined in step 145 that frequency "C" is not being detected by tablet 15, then it is assumed in step 147 that writing tip 33 is in proximity to the tablet and that circuit 35 includes a second side switch capable of emitting (but not currently emitting) frequency "C". Thus, in step 147, the tip in proximity to tablet 15 is marked as writing tip 33 and thereafter if the tip emits the frequency "C", it will be classified as a writing frequency caused by actuation of a second side switch (e.g. switch 51). This classification of the tip will remain until stylus 17 leaves sensing proximity of the tablet as will be determined in step 141.

If, however, in step 145 driver 5 determines that tablet 15 is, in fact, detecting frequency "C", then it is assumed in step 149 that erase tip 31 (and not tip 33) is proximate the tablet. Therefore, if stylus 17 is emitting frequency "C" upon entry into tablet sensing proximity, it is assumed that erase tip 31 (and not write tip 33) is proximate the tablet. Accordingly, it is assumed that the frequency "C" being detected is, in fact, being emitted by circuit 37 and not by circuit 35 when step 149 is performed. After either step 147 or 149, the data packets are forwarded to proximity detect (e.g. see FIG. 12).

When it is determined in step 141 that proximity of the received packets is the same as the previously received packets, then step 151 is performed by the driver in which it is determined whether step 147 or step 149 was previously performed. If step 147 (tip 33 assumed to be adjacent tablet 15) was performed, then driver 5 goes to step 152 where it is again determined whether frequency "C" is being detected. If frequency "C" is being detected, then the system treats the signal in step 154 as resulting from the second side switch (e.g. 51) being closed in circuit 35. Thus, the system treats frequency "C" as a writing frequency in step 154 in which second side switch 51 is closed. If it is determined in step 152 that frequency "C" is not being detected, then it is assumed that second side switch 51 in circuit 35 is open (see step 157) and some other write frequency is being received.

If driver 5 determines in step 151 that step 149 (instead of step 147) was performed above, then it is determined in step 153 whether frequency "C" is still being detected by the tablet. If frequency "C" is still being detected, then it remains assumed that erase tip 31 (not write tip 33) is proximate the tablet and the packets go to proximity detect. However, if frequency "C" is no longer being detected by the tablet, then step 155 is performed in realization that a mistake was made above in the classification made in step 149. In step 155, driver 5 changes the classification of the stylus to one where it is assumed that write tip 33 (as opposed to erase tip 31) is proximate tablet 15 so that, until proximity changes, frequency "C" will be treated as a write frequency instead of an erase frequency.

In sum, steps 151, 153, and 155 double-check the classification of the stylus tip (i.e. whether it is the write tip or the erase tip) proximate the tablet. If a mistake was made step 149 and thereafter the tip adjacent the tablet emits a non-erasing frequency similar to a writing frequency (e.g. frequency "A" or "B") capable of being emitted by circuit 35, then the classification of the stylus tip proximate the tablet is changed from the erase tip 31 classification to a write tip 33 classification in step 155. Such classifications remain the same until stylus 17 leaves sensing proximity of the tablet. In such a manner, it is automatically determined whether erase tip 31 or write tip 33 is adjacent the tablet so that when frequency "C" is emitted, the system knows whether it is being emitted by erase tip 31 or write tip 33.

Figure 14:
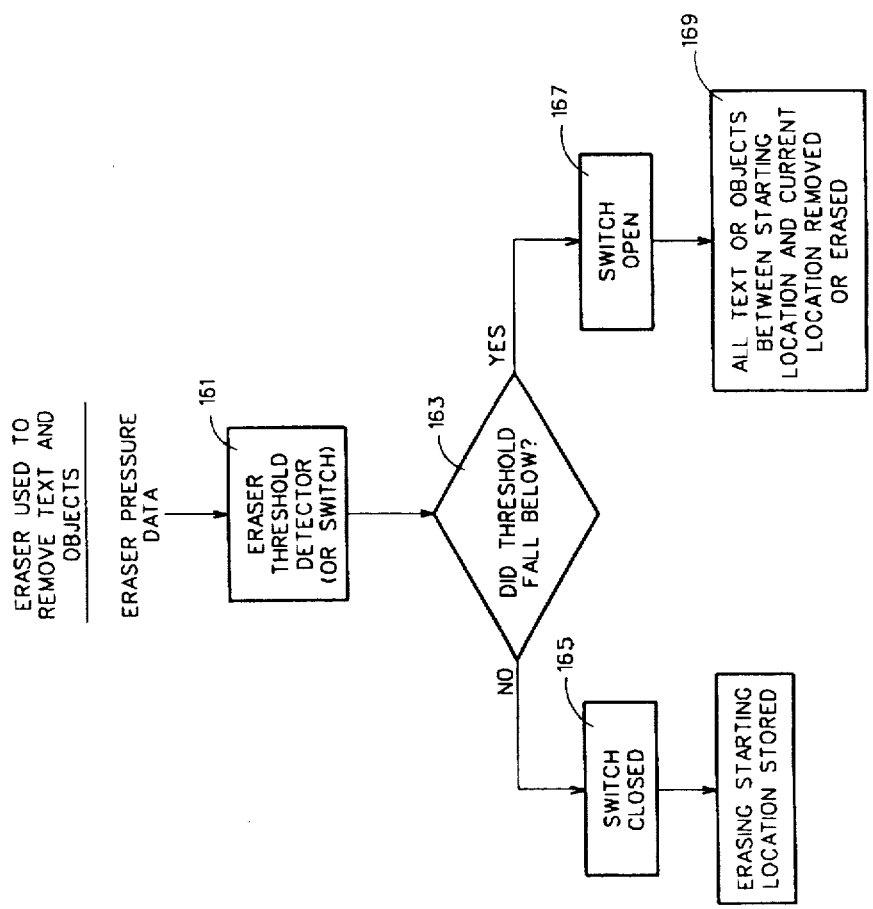
FIG. 14 is a functional flowchart illustrative of the use of the erasing tip of the stylus to remove text or objects from the display screen.

FIG. 14 is a flowchart illustrating how tip 31 of stylus 17 is used to cause objects and text to be erased from display screen 9. According to the FIG. 14 embodiment, erase tip 31 includes a conventional pressure sensitive switch (e.g. variable coil 39 or some other known switch sensitive to either pressure applied to tip 31 or user finger pressure on a side switch) which is indicative of the pressure exerted by erase tip 31 upon the surface of tablet 15. When the user causes pressure exerted by tip 31 to reach a predetermined threshold level, the coil 39 emits an "erasing" signal identified by a predetermined phase and frequency. The erasing signal is emitted by coil 39 until the pressure exerted by tip 31 upon tablet 15 falls below this predetermined threshold.

As shown in FIG. 14, driver 5 first receives packet data from the tablet indicative of the pressure being placed on the tablet by tip 31. In step 161, driver 5 determines whether the predetermined pressure threshold was broken by tip 31 (in either direction). This pressure threshold is analogous to and may be replaced with any suitable switch. If the threshold data from the tablet to the driver is the same as in the previous data packet received by the driver, then the remaining flowchart steps shown in FIG. 14 are bypassed.

If, however, it is determined in step 161 that the erase tip 31 pressure threshold has been broken, driver 5 performs step 163 in order to determine whether the pressure being applied by tip 31 to the tablet "fell below" or "rose above" the threshold level (see FIG. 15 for more detail). If the pressure by tip 31 "rose above" the threshold, then a switch closed function is performed in step 165, this marking the beginning of selection of text or objects for erasure. All text or objects displayed on screen 9 which are passed over by tip 31 after the switch is closed in step 165 are "selected" for erasure until the switch is opened in step 167. Step 167 is performed when the pressure exerted by tip 31 on the tablet "falls below" the predetermined threshold. After the switch is opened in step 167, step 169 is performed by the driver so that all text or objects "selected" by tip 31 for erasure are removed or erased from screen 9. Erasure is performed in step 169 by way of the erasing keystroke functions discussed above with respect to FIG. 11.

Figure 15:
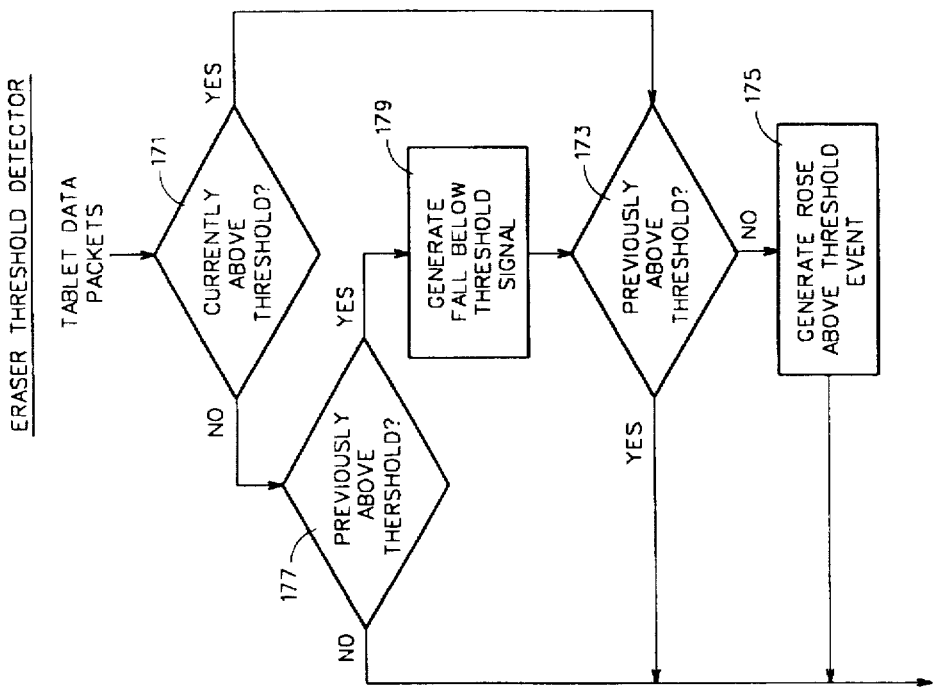
FIG. 15 is a functional flowchart illustrative of an eraser threshold detection system according to certain embodiments of this invention.

FIG. 15 is a flowchart illustrating a threshold detection system according to an embodiment of this invention, the threshold detector of FIG. 15 being applicable to step 161 illustrated in FIG. 14. Driver 5 first receives data packets from tablet 15 indicative of stylus position, switch data (including pressure switch or side switch data) and frequency (including phase). In step 171, the driver determines whether the eraser pressure on the tablet is currently above the threshold level. If so, step 173 is performed to determine whether the threshold was just broken or alternatively if the pressure being exerted was above the threshold in previous packets. If the threshold was broken by the last received data packet, then step 175 is performed by the driver where a "rose above" threshold function is generated (this function being applicable to step 163). This begins the selection by tip 31 of material for erasure.

If it is determined in step 171 that the tip pressure is below the predetermined threshold, then step 177 is performed in order to determine if the pressure just "fell below" the threshold or alternatively if it was previously below the threshold. If previously below the threshold, then all remaining steps are bypassed. However, if the threshold was broken by the last received data packet in the downward direction, then step 179 is performed where driver 5 generates a "fell below" threshold signal which is applicable to step 163 of FIG. 14. In such a manner, the driver 5 determines which text (or objects) is selected for erasure by tip 31 by indicating when the predetermined tip 31 pressure threshold is broken in both directions. All text (or objects) passed over by tip 31 after the "rose above" signal generation and before the "fell below" generation are selected for erasure. Such selected text is thereafter deleted or removed from screen 9 by way of one of the erasing keystroke functions stored in list 123 for example.

FIGS. 16-17 are a block diagram and flowchart, respectively, of an alternative embodiment of this invention to be used in place of patch routine 83 in certain PC-based systems where, for example, MS-Windows is operating system 3 and application program 7 is any of the above-listed programs or any other conventional application program.

When an application program creates a window (180 or 182) using MS-WINDOWS, for example, operating system 3 allocates a block of memory for storing information specific to that window, including the address of the window procedure (185 or 187) that processes messages for the window (180 or 182). When operating system 3 (e.g. MS-WINDOWS) needs to pass a message to window 180 or 182, it searches the window-specific information for the address of the corresponding window procedure (185 or 187) and passes the message to that procedure. "Subclassing" is a known technique that allows an application program to intercept and process messages sent or posted to a particular window (e.g. 180 or 182) before the window has a chance to process them. By subclassing a window, an application program can augment, modify, or monitor the behavior of the window. An application program can subclass any window, including those belonging to a system global class, such as an edit control. For example, many application programs subclass an edit control to prevent the control from accepting certain characters. An application program subclasses a window by replacing the address of the window's original window procedure with the address of a new window procedure, called the subclass procedure (e.g. 181 or 183). Thereafter, the subclass procedure receives (i.e. intercepts) any messages sent or posted to the original window procedure 185 or 187.

Subclass procedures 181 and 183 can take three actions upon receiving a message from OS 3. Firstly, it (i.e. the subclass) can pass the message to the original window procedure 185 or 187. Secondly, it can modify the message and then pass it to the original window procedure. And thirdly, it can process the message and not pass it to the original window procedure 185 or 187. If the subclass procedure processes a message, it can do so before, after, or both before and after it passes the message to the original window procedure 185 or 187.

MS-WINDOWS generally provides two types of subclassing, instance and global. In global subclassing, an application program replaces the address of the window procedure (e.g. 185 or 187) in the WNDCLASS structure of a window class. All subsequent windows created with the class have the address of the subclass procedure, but existing windows of the class are not affected. An application program subclasses an instance of a window by using the SetWindowLong function. The application program passes the GWL WNDPROC flag, the handle of the window to subclass, and the address of the subclass procedure to SetWindowLong. SetWindowLong returns the address of the windows original window procedure. The application program must save the address, using it in subsequent class to the CallWindowProc function, to pass intercepted messages to the original window procedure.

It is known that an application program can subclass any window in the system. However, when subclassing a window it does not own, the application program must ensure that the subclass procedure does not destroy the original behavior of the window. Because the application program does not control the window, it must not depend on information about the window that the owner might change in the future.

To globally subclass a window class, it is known that the application program must have a handle to a window of a class. The application program also needs the handle to remove the subclass. After obtaining the handle, the application program calls the SetClassLong function specifying the handle, the GCL WNDPROC flag, and the address of the subclass procedure. SetClassLong returns the address of the original window procedure for the class. The subclass procedure passes messages to the original window procedure by calling CallWindowProc. The application program removes the subclass from the window class by calling SetClassLong again, specifying the address of the original window procedure, the GCL WNDPROC flag, and the handle to a window of a class being subclassed.

It is known that an application program that globally subclasses a control class must remove the subclass when the application program terminates. Otherwise, an unrecoverable system error may occur. Any number of window classes can be subclassed from edit boxes, which are produced by the operating system, to application specific windows such as the editing window in WORD for Windows.

According to certain embodiments of this invention, a plurality of windows are subclassed (e.g. 180 and 182) while others 184 are not. In certain embodiments, various edit windows 180 are subclassed as are WORD Document Windows 182. Exemplary windows not subclassed include the Program Manager Window and list boxes and static controls.

Subclass procedure 188 in FIG. 17 will pass most messages unmodified to original procedure at 186 because most messages are determined at 201 not to have originated from pointing devices (e.g. a mouse, stylus 17, puck 19, etc.). However, when messages which originate from a pointing device are received, subclass procedure 188 (illustrative of both procedures 181 and 183) will determine from driver 5 in step 203 which pointing device the message came from and will set the cursor shape in step 190 accordingly so as to give visual feedback to the user. For example, if the message is determined in step 203 to have come from erase tip 31 then the cursor shape is set in step 190 to one of the shapes of FIG. 6 as discussed above, with the setting information then being sent from the subclass procedure to the originally addressed window procedure (185 or 187). On the other hand, if the message originated from puck 19, then the cursor shape is set, for example, to a "puck" shape or to a FIG. 5 shape.

The determination of which pointing device (e.g. 17 or 19) originated the message can be made through an interface to driver 5, or through an established API such as WINTAB or PENWINDOWS. Additionally, when it has been determined that the pointer is erase tip 31 and subclass 188 detects in step 191 that a message indicating the end of an erase select stroke (such as WM_LBUTTONUP) has been given indicating that the selection of text for eraser has been completed, subclass 188 causes simulation of an erasing keystroke in step 193 alternatively sends original procedure 185 or 187 a message (e.g. WM_CLEAR) indicative of the need to perform such an erasing keystroke as defined above.

According to certain embodiments of this invention, instance subclassing is used to subclass windows created by application programs such as window 182 for example. However, global subclassing is used to subclass windows created by OS 3, such as edit box or window 180.

According to embodiments where the application program 7 is not designed for use with a stylus eraser and tablet, erasing is possible only in windows (e.g. 180, 182) which are subclassed. Thus, when Wordperfect is the application program, erasing is possible as defined above in windows 180 and 182, but not in windows 184 which are not subclassed. Accordingly, erasing capability is provided for all types of application programs in accordance with different embodiments of this invention.

Once given the above disclosure, therefore, various other modifications, features, or improvements will become apparent to the skilled artisan. Such other features, modifications, and improvements are thus considered a part of this invention, the scope of which is to be determined by the following claims.

We claim:

1. A method of erasing text or objects using a digitizer erasing stylus and tablet in conjunction with a display screen, the stylus having an erasing tip for generating an eraser indicating signal and wherein at least one cursor shape acceptable for erasing and at least one cursor shape not acceptable for erasing are generated for indicating pointed-to positions on the screen by the stylus, the method comprising the steps of:

a) comparing a requested cursor shape to a list of predetermined acceptable erasing cursor shapes, and wherein each of said cursor shapes moves in conjunction with the stylus and indicates on the display screen positions pointed to by the stylus;

b) setting a variable to a valid index if a match is found in step a);

c) setting the variable to an invalid index if no match is found in step a);

d) manipulating the stylus proximate the tablet, with the corresponding cursor shape moving in conjunction with the stylus, in order to select text or objects for erasure; and e) erasing the selected text or objects from the display screen only when the variable is set to a valid index, so that selected text or objects are erased only when the cursor shape on the display screen is in the form of a predetermined acceptable erasing cursor shape, and not erasing when the variable is set to an invalid index and a cursor shape not acceptable for erasing is being used in conjunction with the stylus and shown on the display screen.

2. The method of claim 1, further comprising the steps of:

changing cursor shapes on the display screen by an application program requesting a cursor shape from an operating system, and the application program then setting the cursor shape on the display screen by passing the requested and retrieved cursor shape to the operating system; and performing steps a), b), and c) in response to monitoring the flow of requested and retrieved cursor shapes from the application program to the operating system.

3. The method of claim 1, further comprising the steps of replacing the requested cursor shape with an erasing indicative cursor shape when the variable is set to a valid index and the eraser indicating signal is detected by the tablet; and causing the stylus to emit an erasing signal in order to select text or object for erasure wherein the eraser indicating signal is at a predetermined frequency and the erasing signal is said predetermined frequency and at a predetermined phase.

4. The method of claim 1, further comprising the steps of:

detecting the eraser indicating signal generated by the erasing stylus;

beginning selection of text or objects to be erased by marking the coordinate at which a stylus threshold or switch is first actuated;

selecting text or objects to be erased by moving the stylus across the tablet so that all text or objects selected by the stylus from the first threshold or switch actuation to a second threshold or switch actuation are selected for erasure; and erasing the selected text and objects subsequent to the second threshold or switch actuation.

5. The method of claim 4, further comprising the steps of:

erasing the selected text and objects by performing a keystroke function; and selecting the keystroke function to be used for the erasing from a plurality of possible predetermined keystroke functions, with the keystroke function selected being dependent upon the cursor shape being displayed on the display screen.

6. The method of claim 1, further comprising the steps of:

determining whether the stylus proximate the tablet is in an erasing mode or in a writing mode when both of these modes are capable of generating substantially the same predetermined stylus frequency, the predetermined stylus frequency being substantially equivalent to the eraser indicating signal, the determining including the following steps:

(i) detecting whether the stylus enters sensing proximity of the tablet;

(ii) if entering proximity, then determining whether the stylus is generating the predetermined frequency common to both modes;

(iii) classifying the stylus as a writing stylus if the predetermined frequency is not detected;

(iv) classifying the stylus as an erasing stylus when the predetermined frequency is detected; and (v) changing the classification of the erasing stylus to that of a writing stylus if the classified erasing stylus subsequently emits a frequency other than the common frequency before leaving sensing proximity of the tablet.

7. A digitizer erasing system adapted to be used with a computer having a display screen, the system comprising:

a stylus having a circuit for generating an eraser indicating signal;

a tablet for detecting said eraser indicating signal and location coordinates of the stylus so that a cursor shape on the display screen is continually moved in conjunction with the stylus for indicated positions pointed to by the stylus;

means for generating both at least one cursor shape acceptable for erasing and at least one cursor shape non-acceptable for erasing;

a tablet driver for receiving stylus data from said tablet, said tablet driver adapted to be in communication with the computer; and wherein said tablet driver permits said stylus to erase text or objects from the display screen only when one of a predetermined number of acceptable erasing cursor shapes is being displayed on the display screen, and not permitting erasing when a non-acceptable cursor shape is being used in conjunction with the stylus on the screen.

8. The digitizer erasing system of claim 7, further comprising setting means in said tablet driver for setting a variable to a valid number when the cursor shape being displayed on the screen is one of the predetermined number of acceptable erasing cursor shapes, said setting means also for setting said variable to an invalid number when the cursor shape being used on the screen is not one of the predetermined number of acceptable erasing cursor shapes, and wherein said driver permits erasing by said stylus of selected text or objects only when said variable is set to a valid number.

9. The digitizer erasing system of claim 8, further comprising the computer and display screen, said computer having an operating system and an application program, and wherein said setting means is interposed between said operating system and said application program so that when said application program sends requested cursor shape information to said operating system, said setting means monitors the cursor shape information and sets said variable to one of the valid and invalid numbers in response to the requested cursor shape information sent from the application program to the operating system.

10. The digitizer erasing system of claim 9, wherein said driver further includes replacement means for replacing the requested cursor shape with an erasing indicative cursor shape to be shown on the display screen when said variable is set to a valid number and said eraser indicating signal is detected by said tablet, whereby a user may determine graphically from the display screen whether said stylus will erase selected text or objects.

11. The digitizer erasing system of claim 8, wherein text or objects to be erased are selected in response to first and second stylus originating pressure threshold breaks which cause said stylus to emit an erasing signal between the threshold breaks, wherein the text or objects to be erased are selected so that all text or object(s) passed over by said stylus between said first and second pressure threshold breaks is selected for erasure and subsequently erased.

12. The digitizer erasing system of claim 11, wherein said selected text or object(s) is erased by said driver causing performance of a predetermined keystroke function, said keystroke function performed for erasure being selected from a plurality of possible keystroke functions, with the erasing keystroke selected being in response to the cursor shape being used on the display screen.

13. The digitizer erasing system of claim 7, wherein eraser tilt is detected and compensated for in accordance with detected auxiliary peak voltage values.

14. The digitizer erasing system of claim 7, wherein said stylus includes a writing end having a first circuit for generating a writing frequency and an erasing end having a second circuit for generating an erasing frequency as the eraser indicating signal, said writing frequency being different than said erasing frequency.

15. The digitizer erasing system of claim 14, wherein said first and second circuits are separate and distinct from one another, and wherein said first circuit is a parallel resonance tuning circuit and includes first and second switches and corresponding capacitors arranged in parallel to a variable capacitor.

16. The digitizer erasing system of claim 14, wherein said second circuit includes a variable coil responsive to eraser tip pressure on the tablet and a capacitor which is energized by said tablet, wherein said variable coil emits said erasing frequency at different phases, with certain of the phases being an erasing signal for selecting text or objects for erasure.

17. A method of erasing text or objects from a display screen using a digitizer erasing stylus and corresponding tablet wherein one of first and second cursor shapes on the screen moves in conjunction with the stylus for indicating pointed-to positions that are pointed to by the stylus, the method comprising the steps of:

generating an erasing signal with the erasing stylus;

detecting with the tablet said erasing signal and its coordinate data;

selecting text or objects for erasure in response to said erasing signal and positioning of one of the cursor shapes;

choosing a keystroke function to be used for erasing on the basis of the cursor shape being displayed on the display screen so that a first keystroke erasing function is chosen when the first cursor shape is being used and a second different keystroke erasing function is chosen when the second cursor shape is being used; and erasing in response to the chosen keystroke function the selected text or objects from said display screen in response to said detected erasing signal and corresponding coordinate data.

18. A digitizer erasing system for performing the method of claim 17, the system including said stylus, said tablet, and a tablet driver including means for carrying out said erasing and choosing steps;

and wherein said erasing signal is made up of a predetermined frequency and phase.

19. A method of erasing data on a display screen using an erasing stylus and corresponding digitizer tablet, the method comprising the steps of:

a) bringing the erasing stylus into sensing proximity of the tablet;

b) causing the stylus to generate an eraser indicating signal detected by the tablet;

c) receiving tablet data packets with a driver including stylus coordinate data, eraser data, and switch data;

d) evaluating the switch data and determining whether an eraser switch or threshold has been actuated;

e) when said eraser switch or threshold has been first actuated, a driver simulating a "mouse down" function to at least one of a corresponding application program and operating system so as to begin selection of data for erasure, and simulating a "mouse up" function in response to a second eraser switch or threshold actuation so as to end selection of data for erasure; and f) erasing the data selected for erasure by performing an erasing keystroke function after said "mouse up" simulation.

20. The method of claim 19, further comprising the steps of determining if the tablet is receiving the eraser indicating signal at a predetermined phase indicative of erasing selection, and performing step f) only when the tablet has received the erasing signal at the phase.

21. The method of claim 19, further comprising the step of selecting the keystroke function from a plurality of possible keystroke functions so that the selected keystroke function is dependent upon the cursor shape currently being displayed on the display screen.

22. The method of claim 19, further comprising the steps of determining whether the last requested cursor shape for the display screen is stored in a list of predetermined cursor shapes for which erasure is acceptable, and performing step f) only if the last requested cursor shape is stored in the list of predetermined cursor shapes.

23. A digitizer eraser system for performing the method of claim 19, the system including said stylus, digitizer tablet, and a tablet driver.

24. In a digitizer eraser system including a stylus, a tablet, a computer, and a display screen, a method of providing user feedback by changing cursor shapes when the stylus enters sensing proximity of the tablet so that the displayed cursor shape is indicative of whether the stylus is a write stylus or an erase stylus, the cursor shapes moving on the display screen in conjunction with the stylus so as to indicate positions pointed to by the stylus, the method comprising the steps of:

a) determining when the stylus comes into sensing proximity of the tablet;

b) determining whether an eraser indicating frequency is being emitted from the stylus; and c) replacing the current cursor shape with a cursor shape indicative of eraser functionality when it is determined that the eraser indicating frequency is being emitted from the stylus and detected by the tablet so that the user is informed that the stylus is an erase stylus.

25. The method of claim 24, further comprising the steps of determining whether the current cursor shape is one of a plurality of acceptable cursor shapes for performing erasing functions, and performing step c) only when the current cursor shape is one of the plurality.

26. The method of claim 24, further comprising the step of restoring the cursor shape to the shape last requested by an application program when the stylus leaves sensing proximity of the tablet.

* * * * *